(12) United States Patent
Ellingson et al.

(10) Patent No.: US 8,464,907 B2
(45) Date of Patent: Jun. 18, 2013

(54) LEVEL SENSORS FOR METERING SYSTEM CONTAINER

(75) Inventors: Jon Ellingson, Benson, MN (US); Ed Lagred, Benson, MN (US); Jerry Walton, Benson, MN (US)

(73) Assignee: CNH America LLC, New Holland, PA (US)

( * ) Notice: Subject to any disclaimer, the term of this patent is extended or adjusted under 35 U.S.C. 154(b) by 962 days.

(21) Appl. No.: 12/533,799

(22) Filed: Jul. 31, 2009

(65) Prior Publication Data

US 2011/0024520 A1 Feb. 3, 2011

(51) Int. Cl.
*B67D 7/14* (2010.01)
*G01F 23/00* (2006.01)

(52) U.S. Cl.
USPC .............. 222/65; 222/412; 222/56; 222/66; 73/301

(58) Field of Classification Search
USPC .................. 222/56, 64, 65, 66, 412; 73/299, 73/301
See application file for complete search history.

(56) References Cited

U.S. PATENT DOCUMENTS

| | | | |
|---|---|---|---|
| 2,354,717 A | 8/1944 | Treciokas | |
| 3,110,420 A | 11/1963 | Brewer | |
| 3,578,211 A | 5/1971 | Coapman et al. | |
| 4,079,362 A | 3/1978 | Grimm et al. | |
| 4,100,538 A | 7/1978 | Knepler | |
| 4,378,897 A * | 4/1983 | Kattelmann | 222/56 |
| 4,527,714 A * | 7/1985 | Bowman | 222/56 |
| 4,710,757 A | 12/1987 | Haase | |
| 4,804,111 A * | 2/1989 | Ricciardi et al. | 222/77 |
| 5,004,400 A * | 4/1991 | Handke | 414/808 |
| 5,423,455 A * | 6/1995 | Ricciardi et al. | 222/1 |
| 5,450,984 A * | 9/1995 | Rohr | 222/56 |
| 5,772,319 A * | 6/1998 | Pemberton et al. | 366/76.2 |
| 6,070,539 A | 6/2000 | Flamme et al. | |
| 6,152,310 A * | 11/2000 | Sakai et al. | 209/712 |
| 6,188,936 B1 * | 2/2001 | Maguire et al. | 700/265 |
| 6,192,813 B1 | 2/2001 | Memory et al. | |
| 6,305,573 B1 * | 10/2001 | Fritze et al. | 222/58 |
| 6,584,920 B1 | 7/2003 | Cresswell | |
| 7,040,242 B2 | 5/2006 | Memory | |
| 2008/0283145 A1 * | 11/2008 | Maxwell | 141/114 |

\* cited by examiner

*Primary Examiner* — Kevin P Shaver
*Assistant Examiner* — Stephanie E Williams
(74) *Attorney, Agent, or Firm* — Rebecca Henkel

(57) ABSTRACT

Level sensors for a metering system container are provided that facilitate determining material level within the container despite dusty or damp conditions. In an exemplary embodiment, a material metering system includes a first sensor assembly disposed within a lower portion of the container and a second sensor assembly disposed within an upper portion of the container. Each sensor assembly is configured to output a signal indicative of contact with the material. The material metering system also includes a controller communicatively coupled to the first and second sensor assemblies and configured to engage a transfer of material to the container in response to the signal from the first sensor assembly indicative of contact with the material and to disengage the transfer of material to the container in response to the signal from the second sensor assembly indicative of contact with the material.

17 Claims, 4 Drawing Sheets

LEVEL SENSORS FOR METERING SYSTEM CONTAINER

BACKGROUND

The invention relates generally to level sensors for a metering system container, and more specifically, to a pair of sensors configured to physically contact material within the metering system container to control a flow of material into the container.

In agricultural settings, various types of applicators are employed to deliver liquid or dry fertilizer and/or herbicide to the surface of a field. In a typical configuration, applicators include a material distribution system mounted on a vehicle. The material distribution system is configured to store, meter, and distribute fertilizer and/or herbicide to the field. For example, a material distribution system configured to distribute dry fertilizer generally includes a material holding bin for storing the fertilizer. The material distribution system also includes a metering system configured to receive material from the material holding bin and transfer specific quantities of material to a delivery system. The delivery system typically includes booms that extend laterally outward from the applicator to delivery material to the soil.

Metering systems generally include a storage container configured to receive and store material from the material holding bin prior to transferring measured amounts of material to the delivery system. The storage container typically includes one or more sensors configured to determine a level of material within the container. When the material level approaches a top of the storage container, the sensors will detect this condition and disengage or temporarily interrupt transfer of material from the material holding bin. Sensors will also detect when the material drops below a predetermined level and engage or restart transfer of material from the material holding bin to prevent the metering system from exhausting its supply of material.

Certain metering systems are configured to receive material from the bottom of the container. Such configurations typically employ a float switch configured to float on the surface of the material to determine its level within the storage container. However, more recent metering system configurations employ storage containers configured to receive material from the top. Because conventional float switches are not particularly effective in such arrangements, top loaded metering systems typically employ a photoelectric sensor configured to optically observe the level of material within the storage container. However, photoelectric sensors will not function properly if dust from the material obscures the optical measurement. Similarly, damp material may adhere to the sensor, thereby blocking visual observation of the material level within the storage container. Such dust and moisture are often present in agricultural field settings. If the sensor does not detect that the material has dropped below a minimum level, the metering system may not engage transfer of material from the material holding bin. At that point, the metering system may exhaust its supply of material, thereby resulting in uneven distribution of material across the field.

Consequently, it may be desirable to provide sensors capable of measuring material level within the storage container without becoming ineffective in the presence of dusty or damp conditions.

BRIEF DESCRIPTION

The present invention provides sensor assemblies that may be placed within the metering system storage container and configured to determine material level despite dusty or damp conditions. In an exemplary embodiment, a first sensor assembly is positioned within a lower portion of the container and configured to indicate a low material level in the container based on physical contact with the material. In addition, a second sensor assembly is positioned within an upper portion of the container and configured to indicate a substantially full material level in the container based on physical contact with the material. A controller is communicatively coupled to the first and second sensor assemblies and configured to engage a transfer of material to the container in response to the low material level indication from the first sensor assembly and to disengage the transfer of material to the container in response to the substantially full material level indication from the second sensor assembly. Because the sensor assemblies operate based on physical contact with the material, material level within the storage container may be maintained despite dusty or damp conditions. Therefore, a proper supply of material is provided to a delivery system, thereby resulting in a substantially even distribution of material across a field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
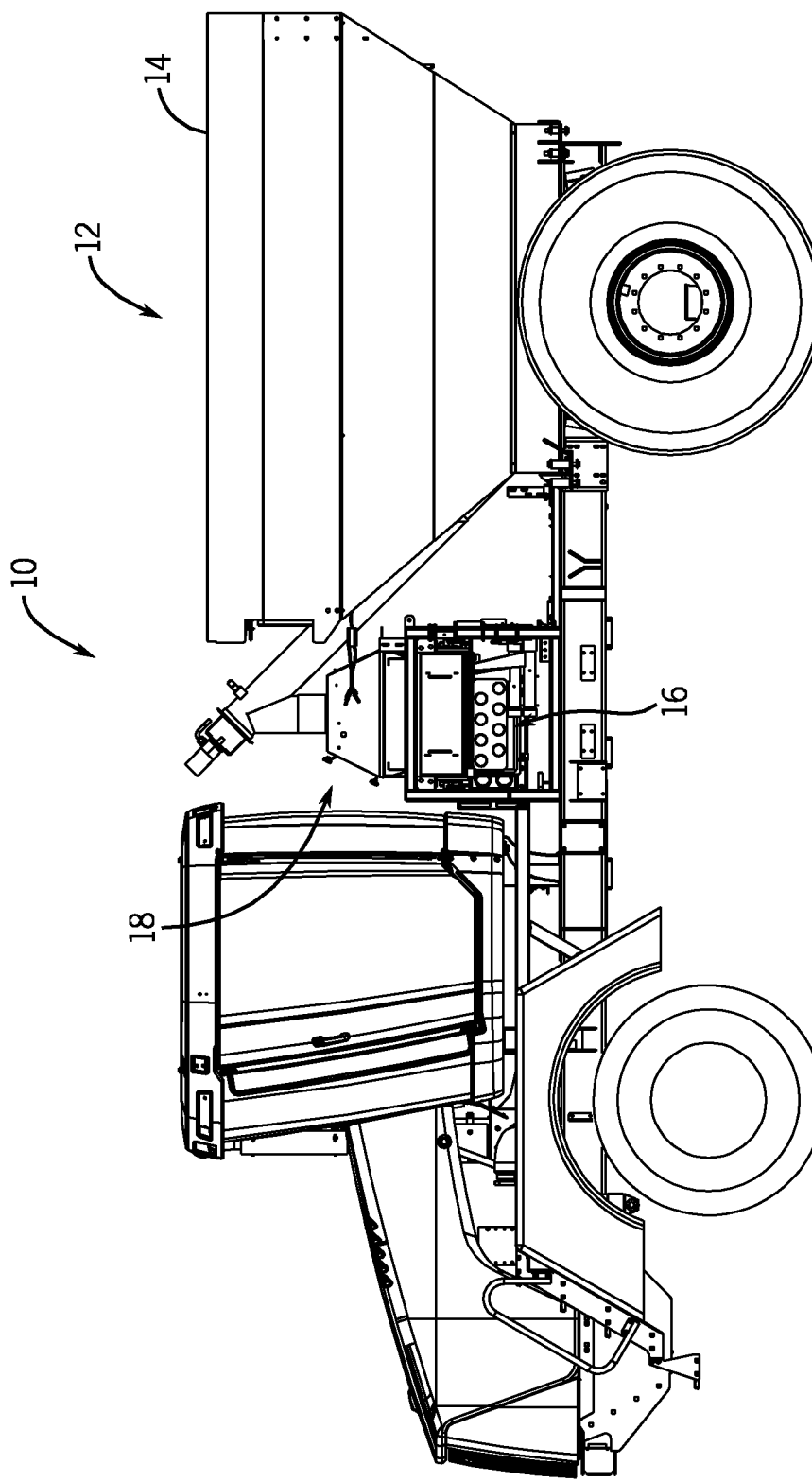
FIG. 1 is a perspective view of an applicator vehicle including a material distribution system.

FIG. 1 is a perspective view of an applicator vehicle 10 including a material distribution system 12. The material distribution system 12 is configured to deliver a dry fertilizer and/or granular herbicide to a field. Specifically, the material distribution system 12 includes a material holding bin 14, a delivery system 16 and a metering system 18. The material holding bin 14 is configured to store material (e.g., fertilizer, herbicide, etc.) for distribution. Material from the material holding bin 14 is conveyed to the metering system 18 by a device capable of transferring dry material (e.g., an auger). The metering system 18 then transfers measured amounts of material to the delivery system 16. Certain delivery systems 16 include booms that extend laterally outward from each side of the applicator vehicle 10. The delivery system 16 receives measured amounts of material from the metering system 18 and dispenses the material onto the soil.

As discussed in detail below, the metering system 18 includes a storage container configured to receive and store material from the material holding bin 14 prior to distribution. In the present embodiment, the storage container includes a first sensor assembly disposed within a lower portion of the container and a second sensor assembly disposed within an upper portion of the container. The sensor assemblies are configured to detect the level of material within the storage container via physical contact between each sensor assembly and the material. In certain embodiments, the first sensor assembly is configured to send a signal indicative of low material level to a controller. The controller, in turn, is configured to engage a transfer of material to the storage container from the material holding bin 14. When the second sensor assembly detects that the material has reached an upper portion of the storage container, the second sensor assembly sends a signal to the controller indicative of a substantially full storage container. The controller then disengages the transfer of material. Such a configuration maintains a suitable level of material within the storage container for distribution, thereby providing the delivery system 16 with a substantially continuous supply of material. Because the sensor assemblies operate based on physical contact with the material, the sensor assemblies are not prone to interference by dusty or damp conditions within the storage container.

Figure 2:
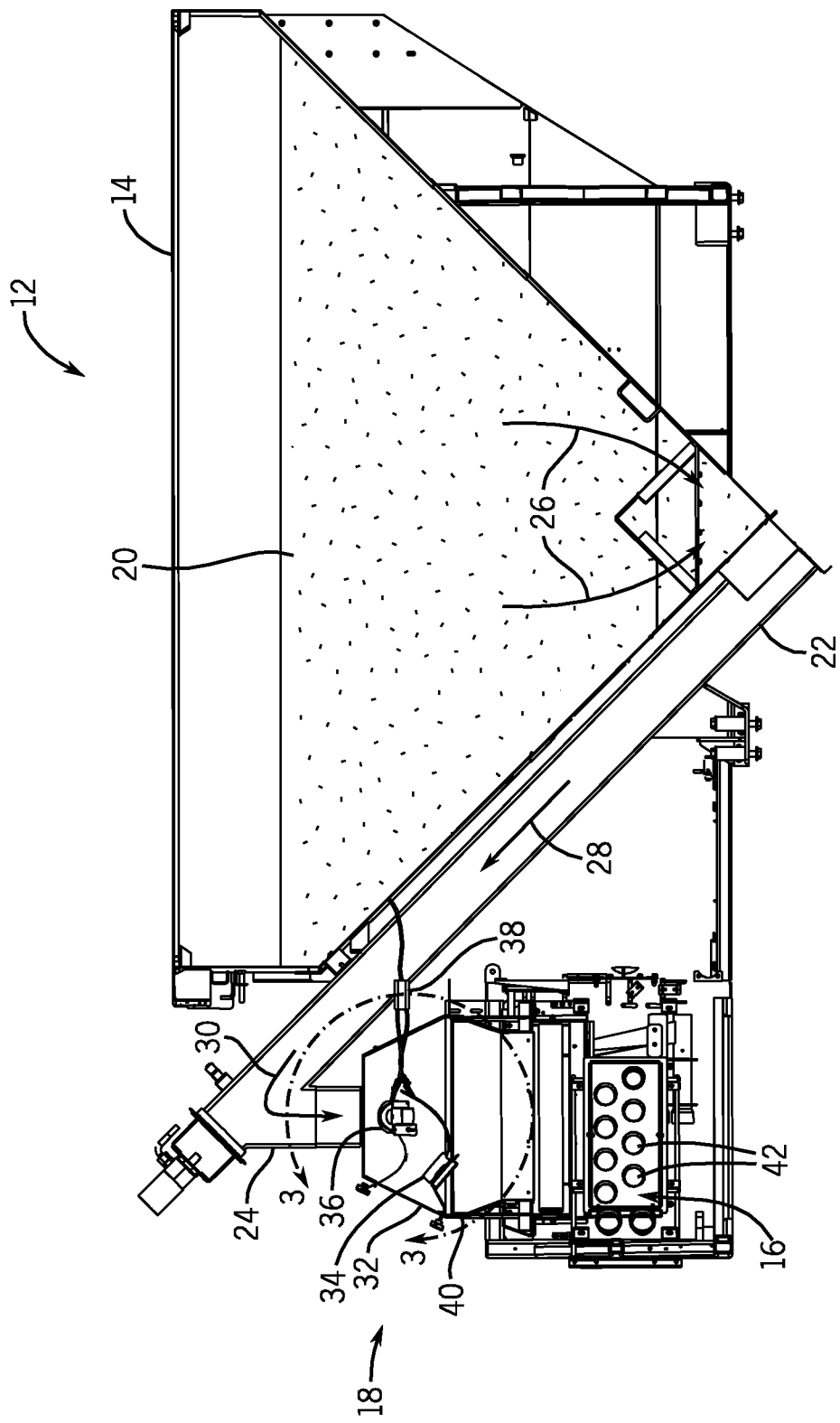
FIG. 2 is a cross section of the material distribution system, as shown in FIG. 1, illustrating exemplary upper and lower sensor assemblies within a metering system storage container.

FIG. 2 is a cross section of the material distribution system 12 showing details of the metering system 18. As illustrated, material 20 (e.g., fertilizer, herbicide, etc.) is stored within the material holding bin 14. For example, certain applicators 10 include material holding bins 14 configured to store between approximately 100 to 500, 200 to 400, 250 to 300, or about 290 cubic feet of material 20. Alternative embodiments may include multiple bins 14 capable of storing different materials. For example, one bin may contain a dry fertilizer, while another bin contains a granular herbicide. A material transport system 22 is coupled to the material holding bin 14 and configured to transfer material 20 to the metering system 18. In the present embodiment, the material transport system 22 includes an auger that moves material along its length as the auger rotates. The material transport system 22 includes a chute 24 that delivers the material into the metering system 18. Specifically, within the holding bin 14, gravity induces the material 20 to flow in a direction 26 toward the material transport system 22. The material 20 is then conveyed in a direction 28 along the material transport system 22 toward the chute 24. As the material 20 reaches the chute 24, it falls in a direction 30 into the metering system 18.

As previously discussed, the metering system 18 includes a storage container 32. The storage container 32 receives material directly from the material transport system 22 through an opening at the top of the container 32. The storage container 32 includes a first sensor assembly 34 positioned at a lower portion of the container 32, and a second sensor assembly 36 positioned at an upper portion of the container 32. Both sensor assemblies 34 and 36 are communicatively coupled to a controller 38. The controller 38 is, in turn, communicatively coupled to the material transport system 22. For example, the controller 38 may be communicatively coupled to a drive motor of the auger, and configured to control operation of the drive motor based on input from the sensor assemblies 34 and 36.

Specifically, the first sensor assembly 34 is configured to send a signal to the controller 38 indicative of a low material level within the storage container 32. Upon detection of the low material level, the controller 38 activates the material transport system 22 to provide additional material to the storage container 32. In this manner, the supply of material within the metering system 18 is continuously maintained. As material collects in the storage container 32, the material eventually rises to the level of the second sensor assembly 36. The second sensor assembly 36 is configured to send a signal to the controller 38 indicative of a substantially full storage container 32. Upon detection of the substantially full container 32, the controller 38 deactivates the material transport system 22. In this manner, the material will be limited to the upper extent of the container 32, i.e., the container 32 will not overflow. As material is drained from the storage container 32 during operation of the metering system 18, the level of material will decrease. Once the level decreases to the point where the first sensor assembly 34 detects a low material level, the controller 38 will reactivate the material transport system 22. This process continuously repeats to ensure a proper level of material within the storage container 32.

From the storage container 32, the material enters a metering assembly 40. In certain configurations, the metering assembly 40 contains meter rollers configured to provide a desired quantity of material to the delivery system 16. In the present embodiment, material flows from the metering assembly 40 to the delivery system 16 and exits conduits 42. In certain embodiments, the conduits 42 are coupled to booms that convey material to the soil. Maintaining a proper material level within the storage container 32 ensures that a sufficient quantity of material flows through the metering assembly 40 to the delivery system 16.

Figure 3:
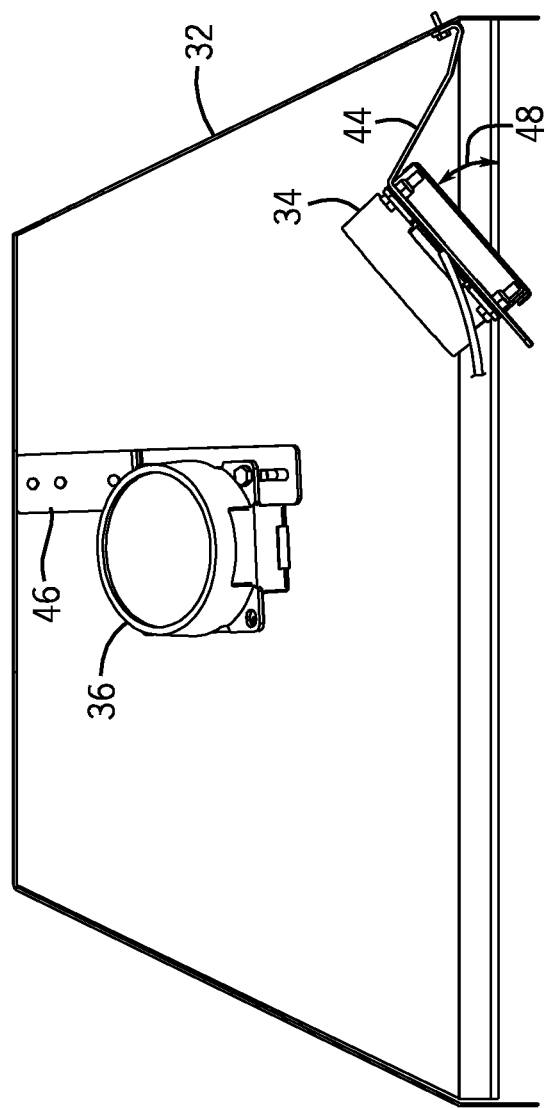
FIG. 3 is a detail view of the metering system storage container of FIG. 2, illustrating exemplary positions and orientations of the sensor assemblies.

FIG. 3 is a detail view of the metering system storage container 32 of FIG. 2, showing exemplary positions and orientations of the sensor assemblies 34 and 36. As illustrated, the first sensor assembly 34 is coupled to a lower portion of the container 32 with a first bracket 44, and the second sensor assembly 36 is coupled to an upper portion of the container 32 with a second bracket 46. As illustrated, each sensor assembly is angled upward with respect to a horizontal plane. Specifically, the first sensor assembly 34 is oriented at an angle 48 with respect to the horizontal plane. As will be appreciated by those skilled in the art, the upward angle may establish a greater contact force between the material in the container 32 and the sensor assemblies 34 and 36. Because the sensor assemblies 34 and 36 include sensors configured to detect the presence of material based on contact, angling the sensor assemblies 34 and 36 upward may provide enhanced detection of material by increasing the contact force between the material and the sensor assemblies 34 and 36.

In the illustrated embodiment, the angle of the second sensor assembly 36 with respect to the horizontal plane is substantially similar to the angle 48 of the first sensor assembly 34. Alternative embodiments may employ sensor assemblies 34 and 36 having different angles. In addition, the angles of the sensors may be larger or smaller, depending upon such factors as the material being processed, the type and sensitivity of the sensor, and so forth. For example, the angles of the sensor assemblies may be approximately between 0 to 90, 15 to 75, 30 to 60, or about 45 degrees in certain embodiments.

Because the material within the storage container 32 may be a dry fertilizer or a granular herbicide, the sensor assemblies 34 and 36 are configured to detect the presence and/or the pressure of a substantially dry powder, as well as of moist materials. For example, sensor assemblies 34 and 36 may be pressure sensors configured to send a signal to the controller 38 indicative of contact with the material. Specifically, as the material level within the storage container 32 decreases, the material applies less pressure to the first sensor assembly 34. At a certain level, the first sensor assembly 34 sends a signal to the controller 38 indicative of a low material level. The controller 38 then activates the material transport system 22 to provide the container 32 with additional material. As the level of material rises, the material applies increasing pressure to the second sensor assembly 36. At a certain level, the second sensor assembly 36 sends a signal to the controller 38 indicative of a substantially full storage container 32. The controller 38 then deactivates the material transport system 22. Such a configuration maintains a suitable level of material within the storage container 32 for distribution, thereby providing the delivery system 16 with a substantially continuous supply of material.

Figure 4:
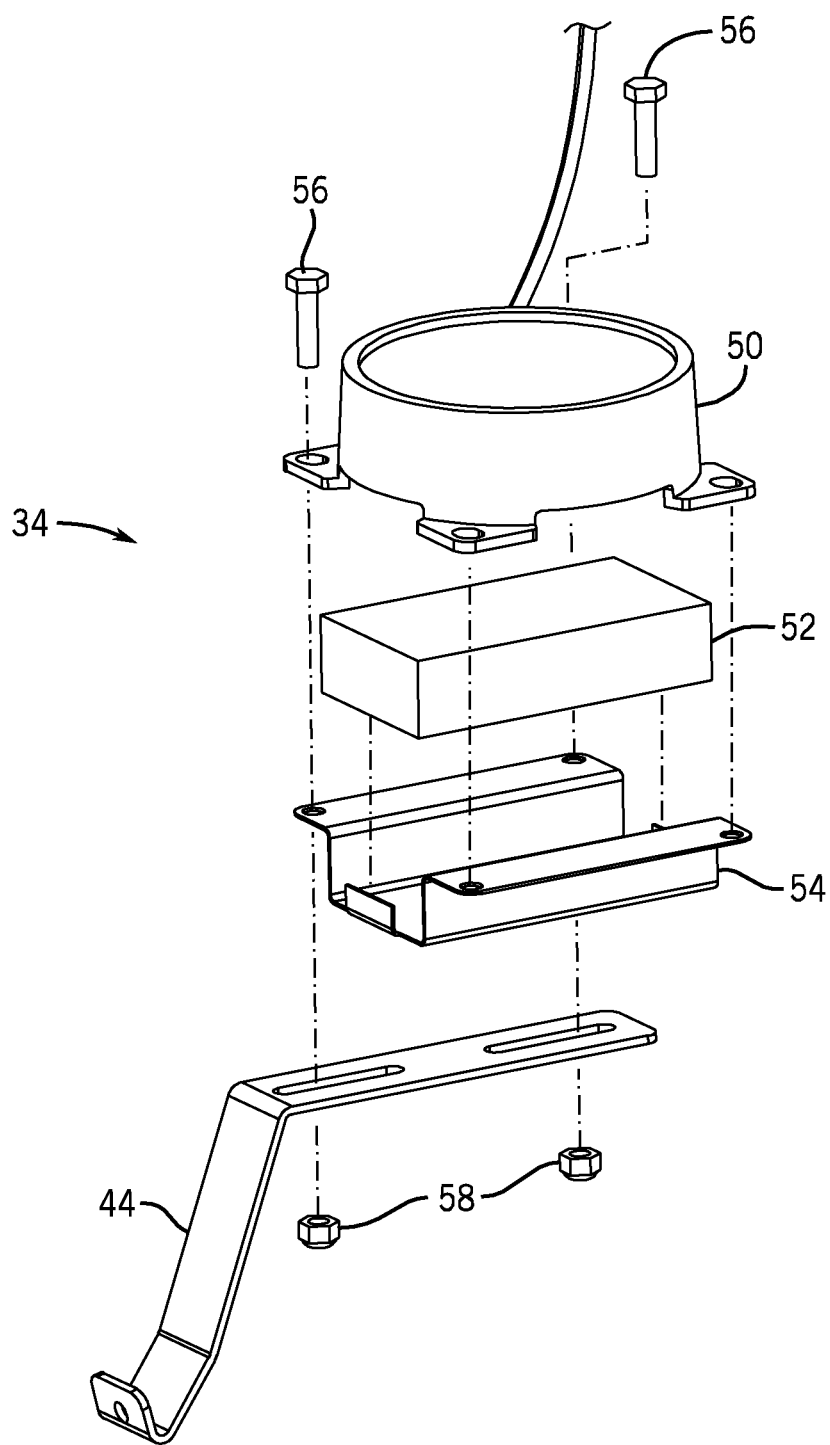
FIG. 4 is an exploded view of the lower sensor assembly, as shown in FIG. 3, illustrating the particulate filtering elements.

FIG. 4 is an exploded view of the lower sensor assembly 34. The upper assembly may be substantially similar, and the two may, in certain implementations, be identical. As illustrated, the lower sensor assembly 34 includes a sensor 50, a filter 52, a filter bracket 54, bolts 56 and fasteners 58. In certain embodiments, the sensor 50 is a diaphragm sensor, such as those manufactured by Elobau Sensor Technology of Leutkirch, Germany. In such embodiments, the sensor 50 includes a flexible diaphragm that forms a front surface of the sensor 50. As pressure is applied to the diaphragm from the weight of material in contact with the sensor 50, the diaphragm deforms. The sensor 50 includes components configured to detect this deformation and output a signal indicative of the degree of deformation. The controller 38 is configured to receive and analyze this signal to detect the presence of material adjacent to the sensor 50. For example, the sensor 50 may include a strain gauge, a Hall-effect sensor, a capacitance sensor, a piezoelectric crystal, or other sensor configured to detect movement of the diaphragm. In alternative embodiments, the sensor 50 is a switch configured to engage upon detection of a particular pressure on the diaphragm. For example, the sensor 50 may include a reed switch configured to activate upon detection of a magnet disposed on the diaphragm. In other words, as the diaphragm deflects due to contact with the material, the magnet moves closer to the reed switch. At a certain magnet distance, the reed switch activates, thereby indicating to the controller 38 that the sensor 50 is in contact with the material. Because the sensor 50 operates based on contact with the material, sensor output will not be affected by dusty or damp conditions within the storage container 32.

As will be appreciated by those skilled in the art, electronic components within the sensor 50 may be sensitive to dust and/or other contaminants within the material. For example, certain fertilizers are corrosive to components located within the sensor 50. Therefore, the sensor 50 is substantially sealed to reduce or prevent material from entering the sensor 50. However, because the diaphragm moves during operation, the volume of air within the sensor 50 varies as the diaphragm deforms. Consequently, the filter 52 is disposed behind the sensor 50 to facilitate air passage through the sensor 50, while substantially blocking material particles such as fertilizer dust. The filter 52 is disposed within the filter bracket 54, which is coupled to the sensor bracket 44. In the present embodiment, the sensor 50 is secured to the bracket 54 by bolts 56 and fasteners 58. Specifically, bolts 56 pass through openings in the sensor 50 and the sensor bracket 54, and are secured by the fasteners 58. The illustrated assembly is configured to block the passage of particulate matter into the sensor 50, thereby facilitating proper sensor operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural material distribution system, comprising:
    a material holding bin;
    a metering system including a container, the metering system configured to deliver material from the container to an agricultural field as the distribution system is transported through the field;
    a material transport system configured to deliver material from the material holding bin to an opening within an upper portion of the container;
    a first sensor assembly positioned within a lower portion of the container and configured to indicate a low material level in the container based on physical contact with the material;
    a second sensor assembly positioned within the upper portion of the container and configured to indicate a substantially full material level in the container based on physical contact with the material; and
    a controller communicatively coupled to the first and second sensor assemblies and configured to operate the material transport system in response to output from the first and second sensor assemblies: wherein each pressure sensor assembly is substantially sealed and includes a filter configured to block material form entering the sensor assembly.

2. The agricultural material distribution system of claim 1, wherein the first and second sensor assemblies each comprise a pressure sensor.

3. The agricultural material distribution system of claim 2, wherein each pressure sensor comprises a diaphragm sensor.

4. The agricultural material distribution system of claim 3, wherein each sensor assembly further comprises means for preventing contaminants from entering the sensor assembly and for permitting free movement of a diaphragm.

5. The agricultural material distribution system of claim 1, wherein the metering system is configured to distribute the material from the lower portion of the container to a soil region.

6. The agricultural material distribution system of claim 1, wherein the controller is configured to activate the material transport system in response to output from the first sensor assembly indicating the low material level and to deactivate the material transport system in response to output from the second sensor assembly indicating the substantially full material level.

7. The agricultural material distribution system of claim 1, wherein the agricultural material distribution system is configured to be mounted on a vehicle.

8. A material metering system, comprising:
    a first pressure sensor assembly configured to indicate a low material level in a container;
    a second pressure sensor assembly configured to indicate a substantially full material level in the container; and
    a controller communicatively coupled to the first and second pressure sensor assemblies and configured to engage a transfer of material to the container in response to the low material level indication from the first pressure sensor assembly and to disengage the transfer of material to the container in response to the substantially full material level indication from the second pressure sensor assembly: wherein each pressure sensor assembly is substantially sealed and includes a filter configured to block material from entering the sensor assembly.

9. The material metering system of claim 8, wherein the material metering system is configured to receive material through an opening in an upper portion of the container.

10. The material metering system of claim 8, wherein the material metering system is configured to distribute material from a lower portion of the container to a soil region.

11. The material metering system of claim 8, wherein the first and second pressure sensor assemblies are configured to measure the pressure of a substantially dry powder.

12. The material metering system of claim 8, wherein the first and second pressure sensor assemblies each comprise a diaphragm sensor.

13. A material metering system, comprising:
- a first pressure sensor assembly configured to indicate a low material level in a container;
- a second pressure sensor assembly configured to indicate a substantially full material level in the container; and
- a controller communicatively coupled to the first and second pressure sensor assemblies and configured to engage a transfer of material to the container in response to the low material level indication from the first pressure sensor assembly and to disengage the transfer of material to the container in response to the substantially full material level indication from the second pressure sensor assembly; wherein the first and second pressure sensor assemblies each comprise a reed switch.

14. The material metering system of claim 8, wherein the controller is configured to activate an auger in response to the low material level indication from the first pressure sensor assembly and to deactivate the auger in response to the substantially full material level indication from the second pressure sensor assembly.

15. A material metering system, comprising:
- a container configured to receive material through an opening within an upper portion of the container;
- a first sensor assembly disposed within a lower portion of the container and configured to output a signal indicative of contact with the material;
- a second sensor assembly disposed within the upper portion of the container and configured to output a signal indicative of contact with the material; and
- a controller communicatively coupled to the first and second sensor assemblies and configured to engage a transfer of material to the container in response to the signal from the first sensor assembly indicative of contact with the material and to disengage the transfer of material to the container in response to the signal from the second sensor assembly indicative of contact with the material; wherein the first and second sensor assemblies each comprise a diaphragm sensor configured to detect contact with a substantially dry powder; wherein each diaphragm sensor comprises a substantially sealed enclosure including a filter configured to block material from entering the enclosure while facilitate the passage of air.

16. The material metering system of claim 15, wherein the first sensor assembly is positioned at a location corresponding to a low material level and the second sensor assembly is positioned at a location corresponding to a substantially full material level.

17. The material metering system of claim 15, wherein the controller is configured to activate an auger in response to the signal from the first sensor assembly indicative of contact with the material and to deactivate the auger in response to the signal from the second sensor assembly indicative of contact with the material.

* * * * *